United States Patent [19]  [11] 4,321,367
Cheng et al.  [45] Mar. 23, 1982

[54] METHOD FOR THE PREPARATION OF CROSS-LINKED POLYSACCHARIDE ETHERS

[75] Inventors: Wen-Jiu Cheng; Ernie V. Luoma, both of Midland, Mich.

[73] Assignee: The Dow Chemical Company, Midland, Mich.

[21] Appl. No.: 182,889

[22] Filed: Sep. 2, 1980

[51] Int. Cl.$^3$ .............................................. C08G 59/68
[52] U.S. Cl. ........................................ 536/88; 536/87
[58] Field of Search ................................... 536/87, 88

[56] References Cited

U.S. PATENT DOCUMENTS

| | | | |
|---|---|---|---|
| 2,650,917 | 9/1953 | Moe | 536/114 |
| 3,152,925 | 10/1964 | Patel et al. | 536/111 |
| 3,574,188 | 4/1971 | Takehara et al. | 536/88 |
| 4,129,722 | 12/1978 | Iovine et al. | 536/43 |
| 4,175,183 | 11/1979 | Ayers | 536/88 |

OTHER PUBLICATIONS

Brown, W. et al., *Chem. Abs.*, 1972, 77, 154, 143a.
"Cellulose and Cellulose Derivatives" vol. V, Part V (Wiley–Interscience), pp. 849–850.

*Primary Examiner*—A. Lionel Clingman

[57] ABSTRACT

In the preparation of etherified polysaccharides, the inclusion of a polyhalo methane or an alkylene dihalide in the etherification reaction mixture yields a water-soluble, cross-linked product which exhibits increased viscosities in aqueous solution. For example, the admixture of a cellulose, e.g., cotton linter; an alkali metal hydroxide; etherifying agents such as methyl chloride or propylene oxide; and 1,2-dichloroethane in a reaction diluent such as toluene can be heated to form a water-soluble, cross-linked hydroxypropyl methylcellulose exhibiting increased solution viscosities.

14 Claims, No Drawings

METHOD FOR THE PREPARATION OF CROSS-LINKED POLYSACCHARIDE ETHERS

BACKGROUND OF THE INVENTION

This invention relates to the preparation of polysaccharides, particularly, to the preparation of cross-linked, etherified polysaccharides.

Polysaccharide derivatives, particularly water-soluble, etherified polysaccharides such as methylcellulose, are used extensively as binders, film formers and thickeners in various products including cosmetics, adhesives, printing inks and paints. Conventionally, the polysaccharide ethers are prepared by reacting the reaction product of a polysaccharide and an alkali metal hydroxide with an etherifying agent, e.g., methyl chloride or butylene oxide, in the presence of an inert, reaction diluent such as toluene.

In general, when employed as thickeners, the etherified polysaccharides advantageously exhibit a relatively high viscosity in an aqueous liquid. This ability of the etherified polysaccharide to effectively thicken an aqueous liquid is primarily controlled by the molecular weight (degree of polymerization) of the polysaccharide, with the higher molecular weight polysaccharides generally exhibiting the higher viscosities. Unfortunately, the molecular weight of etherified polysaccharides is limited by the molecular weight of the polysaccharide starting material and the extent of the degradation of the polymer structure during the etherification reaction.

Heretofore, to increase the molecular weight of polysaccharide derivatives, they have been cross-linked with various cross-linking agents. For example, U.S. Pat. No. 2,650,917 teaches that a polysaccharide derivative such as a derivative of glucomannan gum can be cross-linked with a polyfunctional etherification reagent such as bis-(2-chloroethyl ether) or epihalohydrin to render a cross-linked product exhibiting exceptional higher viscosities upon dissolution in water. Other cross-linking agents disclosed as being useful in preparing cross-linked polysaccharides and polysaccharide derivatives which exhibit improved viscosities in water include dichlorobutene and dichloroacetic acid. See, for example, U.S. Pat. Nos. 2,988,455 and 3,152,925. While the prior art cross-linking agents effectively cross-link the polysaccharides and derivatives thereof, thereby increasing their molecular weights, the concentration of the cross-linking agent and the conditions of the cross-linking reaction must be carefully controlled to prevent the formation of relatively large amounts of unwanted, water-insoluble materials. Moreover, most of the disclosed cross-linking agents are highly reactive and cannot be handled without risk unless special precautions are taken.

In view of the stated deficiencies of the prior art, it remains highly desirable to prepare water-soluble, cross-linked polysaccharide ethers which exhibit increased viscosities when dissolved in water without the coincident formation of substantial amounts of water-insoluble product.

SUMMARY OF THE INVENTION

Accordingly, the present invention is a method for effectively preparing a cross-linked polysaccharide ether. This method comprises contacting the polysaccharide with an amount of a polyhalo hydrocarbon selected from the group consisting of polyhalo methane and an alkylene, alkylidene or halo substituted alkylene or alkylidene polyhalide bearing two halo substituent groups wherein each halo group is bonded to a primary or secondary carbon atom of an alkylene, alkylidene or halo substituted alkylene or alkylidene group having two or more carbon atoms at conditions sufficient to cross-link the polysaccharide without substantial amounts of the resulting polysaccharide being insoluble in water. Said contact can be conducted prior to, simultaneous with or subsequent to the etherification of the polysaccharide.

The method of the present invention is unique in that a water-soluble, cross-linked polysaccharide ether is effectively prepared using a polyhalo methane, alkylene polyhalide or alkylidene polyhalide cross-linking agent. Surprisingly, the cross-linking reaction is easily controlled such that the expected formation of significant amounts of water-insoluble materials does not occur. Moreover, by the method of the invention, the cross-linked polysaccharide ethers are normally solid materials which can readily be dissolved in an aqueous liquid to form a solution exhibiting increased viscosities.

In a preferred embodiment, the present invention is an effective method for the in situ preparation of the cross-linked, polysaccharide ether. The method of this embodiment comprises contacting the polysaccharide etherification reaction mixture with a polyhalo methane or alkylene or alkylidene polyhalide in an amount and at conditions sufficient to form a water-soluble, cross-linked polysaccharide ether which is not substantially insoluble in water.

The cross-linked polysaccharide ethers prepared by the method of the present invention are useful as a component in a variety of compositions such as protective coatings, adhesives, binders, ink formulations and lacquers. The cross-linked products are particularly useful as thickeners for various compositions, particularly paints.

DETAILED DESCRIPTION OF ILLUSTRATIVE EMBODIMENTS

For the purposes of this invention, the terms "polysaccharide" and "polysaccharide ether" are used conventionally. Polysaccharide refers generally to a compound of three or more monosaccharide units linked together by glycosidic bonds. Representative polysaccharides include cellulose, natural gums such as arabic, tragacanth, guar and karaya gum; xanthan gum; dextran; starches such as corn and wheat starch, with cellulose being the most preferred. Polysaccharide ethers are the etherified products of a polysaccharide. Representative of such ethers are the cellulose ethers such as alkyl or hydroxyalkyl alkylcellulose, e.g., methylcellulose, hydroxypropyl methylcellulose, hydroxyethyl methylcellulose, ethyl methylcellulose, hydroxyethyl hydroxypropyl methylcellulose and carboxymethyl methylcellulose; etherified natural gums such as hydroxypropylated guar gums; modified starches such as hydroxypropyl starch and the like. The method of this invention is particularly useful for preparing cross-linked, polysaccharide ethers wherein the polysaccharide ether is soluble in water in an amount of at least about 1, preferably at least about 5, weight percent based on the weight of the water and polysaccharide. Preferred polysaccharide ethers are the cellulose ethers, with methylcellulose, advantageously having a methoxyl degree of substitution from about 0.1 to about 2.7, more advantageously from about 1.4 to about 2.4, and hydroxypropyl methylcellulose, advantageously having a methoxyl degree of substitution from about 0.1 to about 2.7 and hydroxypropyl molar substitution from about 0.05 to about 2.5, wherein methoxyl and hydroxypropyl contents are determined by the test method designated ASTM D-2363-72; and carboxymethyl methylcellulose being most preferred.

Methods of preparing the polysaccharide ethers, including the kinds and proportions of the etherification reactants (e.g., the polysaccharide, alkali metal hydroxide and etherifying agent), the reaction diluent, catalysts and the like are well known and reference is made thereto for the purposes of this invention. Illustrative of such methods are U.S. Pat. Nos. 2,163,869; 2,249,673; 2,254,249; 3,903,076 and *Water Soluble Resins* edited by Robert L. Davidson and Marshall Sittig, published in 1962 by Reinhold Publishing Corp., N.Y., pages 21–87, all of which are hereby incorporated by reference.

In one of the disclosed methods, the preparation of the desired polysaccharide ether comprises a two-step process wherein the first step comprises the preparation of an alkali polysaccharide by conventional techniques such as illustrated by U.S. Pat. Nos. 2,143,855; 2,143,863; 2,145,862; 2,149,309 and 2,149,310; all of which are hereby incorporated by reference. The desired polysaccharide ether is then prepared by reacting the resulting alkali cellulose with an etherifying agent or combination of two or more etherifying agents in the presence of an alkali metal hydroxide in an oxygen-free atmosphere. Alternatively, the polysaccharide ether is prepared in a single reaction vessel (a one-stage process) without the intermediate product purification between the preparation of the alkali polysaccharide and subsequent preparation of the polysaccharide ether.

Etherifying agents generally employed in the preparation of the polysaccharide ethers include alkyl monochlorides, e.g., methyl chloride; vicinal epoxides, e.g., 1,2-propylene oxide and 1,2-butylene oxide, and monochlorocarboxylic acids or alkali metal salts thereof, e.g., monochloro-substituted acetic, propionic or butyric acid.

As used herein, the term "polysaccharide etherification reaction mixture" refers to the mixture of reactants which react to form the polysaccharide ether. In general, the etherification reaction mixture will consist of the alkali cellulose (or, alternatively, the cellulose and alkali metal hydroxide), one or more etherifying agents and, if employed, a reaction diluent.

The cross-linking agents employed in the preparation of the cross-linked polysaccharide ethers are polyhalo hydrocarbons of a polyhalo methane or an alkylene, alkylidene or halo substituted alkylene or alkylidene polyhalide, wherein the prefix "poly" refers to two or more. Representative examples of polyhalo methanes are methyl dichlorides (methylene chloride) methyl bromide chloride, chloroform and carbon tetrachloride. As used herein, the term "alkylene, alkylidene or halo substituted alkylene or alkylidene polyhalide" refers to halo substituted hydrocarbons which bear two halo substituent groups wherein each halo substituent group is bonded to a primary or secondary carbon atom of an alkylene, alkylidene or halo substituted alkylene or alkylidene radical of two or more carbon atoms. By the term "alkylene" is meant a bivalent saturated aliphatic radical wherein the two valences are on different carbon atoms, e.g., ethylene (—CH$_2$CH$_2$—). By the term "alkylidene" is meant a bivalent radical wherein the two valences are on the same carbon atoms, e.g., ethylidene

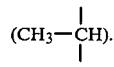

In general, such alkylene, alkylidene or halo substituted alkylene or alkylidene polyhalides advantageously employed herein are represented by the structural formula:

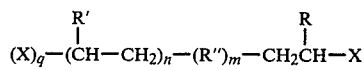

wherein each X is a halogen, n and m are individually 0 or an integer, q is 0 or 1 provided that if R is not a halogen then q is 1, R and R' are individually hydrogen, halogen or an alkyl and R'' is an aliphatic (which term includes alicyclic) or aromatic. Representative polyhalides include 1,1-dichloroethane (ethylidene chloride); 1,2-dichloroethane; 1,3-dichloropropane; 1,4-dichlorobutane and 1,3-dichlorobutane. Preferably, q is 1, each X is chlorine or one X is chlorine and one X is bromine; n is 0 or an integer from about 1 to about 5, m is 0 and R and R' are individually hydrogen or methyl. To assist in controlling the amount of water-insoluble product which is prepared, the polyhalo hydrocarbon advantageously bears a halo group having a bond dissociation energy of more than about 70 kcal/mole, wherein bond dissociation energy is measured by conventional techniques. The more preferred polyhalo hydrocarbons are chloroform, carbon tetrachloride and those compounds represented by the structural formula:

wherein X is a halo group and n is an integer from 1 to about 10. Advantageously, each X is chlorine or one X is chlorine and one X is bromine and n is from 1 to 4. Representative of the more preferred polyhalo hydrocarbons are methylene chloride, 1,3-dichloropropane, 1-chloro-3-bromopropane and 1,4-dichlorobutane. Most preferred cross-linking agents are methylene chloride, 1,2-dichloromethane, 1,3-dichloropropane and 1,4-dichlorobutane.

The described polyhalo hydrocarbons are employed in an amount sufficient to cross-link the polysaccharide without forming a substantial quantity of cross-linked polysaccharide ether which is insoluble in water. For the purposes of this invention, the quantity of the water-insoluble product is that amount which is insoluble (remains solid) upon the dissolution (hydration) of the cross-linked polysaccharide ether in water. Such quantity is easily measured by employing conventional test methods such as the method described by ASTM D-1347-54T. In general, there exists some maximum amount of water-insoluble product above which the viscosity of an aqueous solution of the cross-linked polysaccharide ether decreases rapidly and significantly. Advantageously, the amount of the polyhalo hydrocarbon employed herein is an amount at which such quantities of water-insoluble product are not formed. In general, the maximum amount of water-insoluble product at which such decrease in viscosity is exhibited varies with the specific polyhalo hydrocarbon and the specific polysaccharide ether. For example, as the amount of water-insolubles exhibited by a hydroxyethyl methylcellulose cross-linked with 1,2-dichloroethane increases above about 6 weight percent, an aqueous solution of the cross-linked cellulose ether exhibits substantial viscosity decreases. Alternatively, as much as 25 weight percent of a carboxymethyl methylcellulose cross-linked with 1,2-dichloroethane can be water-insoluble without an aqueous solution thereof exhibiting a significant reduction in viscosity. Typically, however, the polyhalo hydrocarbon is used in an amount such that less than about 10, advantageously less than about 7, preferably less than about 5, weight percent of the cross-linked polysaccharide ether is water-insoluble.

In addition, the amount of the polyhalo hydrocarbon most advantageously employed herein is dependent on the desired viscosity of the cross-linked polysaccharide ether when said viscosity is measured as a 1 or 2 weight percent solution in water using a Ubbelhode viscometer (1.1 mm inside diameter) at 25° C. Advantageously, sufficient amounts of the cross-linking agent are employed to increase the viscosity of a 2 percent, by weight, aqueous solution of the polysaccharide ether by at least about 30, preferably at least about 50, more preferably at least about 100, percent when compared to an identical polysaccharide ether which has not been cross-linked.

The amounts of the polyhalo hydrocarbons which impart these desired viscosity increases without causing substantial amounts of the resulting material to be water-insoluble will vary depending on a variety of factors including the specific polysaccharide ether being prepared, e.g., the type and amount of substitution, the specific polyhalo hydrocarbon being employed and the specific method employed in preparing the cross-linked polysaccharide ether. Typically, from about 0.01 to about 20, preferably from about 0.1 to about 16, weight percent of the polyhalo hydrocarbon is employed wherein the weight percent is based on the weight of the polysaccharide.

In general, the cross-linking of the polysaccharide or polysaccharide ether is advantageously conducted under alkaline conditions. Base advantageously employed herein are water-soluble hydroxides, preferably the alkali metal hydroxides, preferably employed as an aqueous solution of an alkali metal hydroxide, particularly sodium hydroxide. The amount of the base most advantageously employed herein will generally vary from about 0.8 to about 1.5 times the stoichiometric amount of the polyhalo hydrocarbon, with about stoichiometric amounts preferably employed.

In one method for preparing the cross-linked polysaccharide ether, the polysaccharide is cross-linked prior to the etherification reaction and the cross-linked polysaccharide subsequently etherified. Advantageously, in this method, the polysaccharide is dispersed in an inert organic liquid useful as the reaction diluent in the etherification reaction containing a base and a suitable amount of the polyhalo hydrocarbon added to the resulting dispersion. The resulting mixture is then heated at elevated temperatures sufficient to cross-link the polysaccharide, advantageously from about ambient temperatures, e.g., from about 18° to about 25° C., to about 100° C. until the desired product is obtained. In an alternative method, the cross-linking occurs subsequent to the etherification of the polysaccharide. In said method, the polysaccharide ether, which is advantageously dispersed in an inert organic liquid, is contacted with the polyhalo hydrocarbon and the resulting admixture heated at the elevated temperatures until the desired product is obtained.

In a preferred embodiment, the present invention involves the in situ preparation of the cross-linked polysaccharide ether, i.e., the polysaccharide is simultaneously contacted with the etherifying agent and the polyhalo hydrocarbon. In this preferred method, the preparation of the cross-linked polysaccharide ether comprises contacting the polysaccharide etherification reaction mixture with the polyhalo hydrocarbon in an amount and at conditions sufficient to form the cross-linked polysaccharide ether without the coincident formation of substantial amounts of water-soluble products. In general, in such in situ preparation of a cross-linked polysaccharide ether, the alkali metal hydroxide in the polysaccharide etherification reaction is normally present in an amount such that additional amounts of base are not required for cross-linking the polysaccharide.

Although the in situ preparation of the cross-linked polysaccharide ether may be conducted neat, its preparation is advantageously conducted in the presence of a reaction diluent. Reaction diluents suitably employed in the etherification of an alkali polysaccharide are generally useful herein. Advantageously, such reaction diluents are organic liquids which are inert to the etherification and cross-linking reactions. Such reaction diluents are preferably a solvent for the etherifying agent(s), i.e., the reaction diluent and etherifying agents form a true solution, and a nonsolvent, i.e., does not dissolve, for the polysaccharide or the resulting cross-linked polysaccharide ether. Representative inert organic liquids useful as the reaction diluent herein are aromatic hydrocarbon, particularly alkyl benzenes such as toluene, aliphatic hydrocarbons such as hexane, aliphatic alcohols such as isopropanol and t-butanol, lower ketones such as acetone and methyl ethyl ketone, kerosene, mineral spirits, glycol ethers such as propylene glycol isobutyl ether, ethylene glycol phenyl ether, tripropylene glycol methyl ether and mixtures thereof. Preferred inert organic diluents include the aromatic hydrocarbons with toluene being most preferred. When employed, the reaction diluent is advantageously employed in amounts from about 5 to about 30, preferably from about 12 to about 16, weight parts per weight parts of the reactants, i.e., the alkali polysaccharide (or the polysaccharide and alkali metal hydroxide), the etherifying agents and the cross-linking agents.

Often, in the practice of this invention a surfactant is added to the reaction mixture to help maintain the distribution of the reactants throughout the reaction mixture. Surfactants useful herein are generally those surfactants which are soluble in the inert organic, reaction diluent and which assist in maintaining a uniform dispersion. Although the surfactants most advantageously employed herein are dependent on various factors including the reaction diluent and the particular reactants employed, representative of the surfactants which are advantageously employed herein are water-soluble surfactants stable in a basic medium (i.e., an aqueous alkali metal hydroxide solution) such as sorbitan monostearate, sorbitan monolaurate, sorbitan tristearate, sorbitan monooleate and the like. Typically, from about 0.05 to about 5 weight percent, based on the weight of the polysaccharide, of the surfactant is advantageously employed.

In conducting the in situ preparation of the cross-linked polysaccharide ether, the order of the addition of the reactants to the reaction mixture is not particularly critical. Advantageously, the reactants are added to the reaction diluent in their proper proportions while maintaining the diluent at ambient temperatures, i.e., from about 18° to about 25° C., and agitating the diluent to provide an essentially homogeneous mixture of the reactants.

The in situ preparation of the cross-linked polysaccharide ether is advantageously conducted at elevated temperatures from about 50° to about 120° C. Generally, the temperature of the etherification reaction mixture containing the polyhalo hydrocarbon is advantageously maintained at temperatures from about 70° to about 100° C. for a period sufficient to prepare the desired cross-linked polysaccharide ether. In general, at such temperatures, the in situ preparation of the desired product requires a reaction time of at least about 0.5 hour, with reaction times from about 0.5 to about 5 hours being preferred.

Following the completion of the reaction, the cross-linked polysaccharide ether is recovered from the reaction mixture by conventional techniques well known in the art. Typically, such recovery consists of separating the etherified polysaccharide from the reaction mixture using conventional filtering techniques and washing the filtered material with an inert organic liquid such as acetone to remove any unreacted materials and the reaction by-products. The resulting product is then dried. When preparing those polysaccharide ethers, e.g., methylcellulose, which exhibit inverse solubility in water, the polysaccharide ether is then advantageously washed with water at a temperature at which the cross-linked polysaccharide is not soluble therein, e.g., boiling water. The cross-linked polysaccharide ether is then advantageously air dried and ground to desired size.

The following examples are set forth to illustrate the embodiments of the present invention and should not be construed to limit its scope. In the examples, all parts and percentages are by weight unless otherwise indicated.

EXAMPLE 1

To a suitably sized, nickel clad pressure vessel equipped with an agitator, heating and cooling means and thermometer is added, with agitation, 7000 parts of toluene and 550 parts of an aqueous solution of 50 weight percent solution hydroxide. The vessel is closed and purged with nitrogen for 5 minutes, followed by the addition of 60 parts of a sorbitan monostearate surfactant and 454 parts cotton linter (intrinsic viscosity in sodium ferric tartrate of 1930 ml/g). The vessel is purged with nitrogen for an additional 20 minutes and the 18 parts of 1,2-dichloroethane, 180 parts of propylene oxide and 500 parts of methyl chloride are added. While mildly agitating the resulting mixture, the vessel is slowly heated to a temperature of about 65° C. and maintained at this temperature for a two-hour period. At the end of this period, the temperature of the vessel is slowly increased over a one and one-half-hour period to 95° C. This temperature is maintained for an additional period of about 5 hours. At the end of this period, the reaction mixture is cooled to ambient temperatures and the pressure vessel vented. The reaction mixture is filtered and the filtered material washed with excess amounts of acetone and then air dried. The air dried material is then washed with excess amounts of boiling water and the washed product air dried in a forced air oven at 100° C. The resulting, purified product is ground to a particle size of about 0.42 mm and the ground product designated Sample No. 1.

In a similar manner, several additional cross-linked, hydroxypropyl methylcelluloses (Sample Nos. 2–6) are prepared using the amounts of the 1,2-dichloroethane (ethylene chloride) cross-linking agent specified in Table I. As a control, a hydroxypropyl methylcellulose (Sample No. C) is prepared by the same procedure except no 1,2-dichloroethane is added to the reaction mixture.

Each of the resulting cross-linked, hydroxypropyl methylcelluloses is tested for viscosity and percent water-insolubles. The results for this testing are set forth in Table I.

TABLE I

| Sample No. | Cl—CH$_2$CH$_2$—Cl Conc., % (1) | Viscosity, cps (2) | Solids, % (3) |
|---|---|---|---|
| C* | 0 | 132,000 | 0.3 |
| 1 | 4 | 900,000 | 0.5 |
| 2 | 8 | 2,300,000 | 0.7 |
| 3 | 12 | 4,500,000 | 2 |
| 4 | 16 | 20,000,000 | 5 |
| 5* | 20 | 14,000,000 | 8 |
| 6* | 24 | 5,500,000 | >10 |

*Not an example of the present invention.
(1) Concentration of the 1,2-dichloroethane reported as the weight percent of 1,2-dichloroethane based on the weight of the cellulose.
(2) Viscosity is measured as a 2 weight percent solution of the cross-linked cellulose ether in an aqueous solution using a Ubbelhode viscometer having an inside diameter of 1.1 mm at 20° C. by the method described by D-1347-54T.
(3) The percent solids is that percentage of the cross-linked product which is found to be water-insoluble using a conventional test method such as described by D-1347-54T.

As evidenced by the data recorded in Table I, hydroxypropyl methylcellulose cross-linked using 1,2-dichloroethane exhibits significantly increased viscosities when compared to an identical hydroxypropyl methylcellulose having no cross-linkages. As noted by Table I, as the amount of the 1,2-dichloroethane employed increases from 16 to 20 percent of the cellulose, the percent solids (water-insolubles) become undesirably high with a coincident, significant reduction in the viscosity of a 2 weight percent solution of the etherified product. At 24 percent of the 1,2-dichloroethane, a further reduction in viscosity, with further undesired increases in percent solids, is experienced. In addition, those compositions of the polysaccharide ethers prepared using 20 and 24 percent 1,2-dichloroethane exhibited significantly increased haze and fiber content than the compositions of the polysaccharide ethers prepared using lower amounts of 1,2-dichloroethane.

Similar results are obtained using the isobutyl ether of propylene glycol sold as Dowanol® PiB-T by The Dow Chemical Company as the inert, organic reaction diluent.

EXAMPLE 2

Following the method of Example 1, a series of cross-linked, hydroxypropyl methylcelluloses (Sample Nos. 1–3) are prepared using the different amounts of the various polyhalo hydrocarbons specified in Table II. In addition, a hydroxypropyl methylcellulose having no cross-linking is prepared as a control. Each of the purified cross-linked, hydroxypropyl methylcelluloses and the control hydroxypropyl methylcellulose is tested for viscosity and percent solids. The results of this testing are set forth in Table II.

TABLE II

| Sample No. | Cross-Link Agent Type | Conc., % (1) | Viscosity, cps (2) | Solids, % (3) |
|---|---|---|---|---|
| C* | — | — | 132,000 | 0.3 |
| 1 | $CH_2Cl_2$ | 10 | 15,000,000 | >3 |
| 2 | $Cl(CH_2)_3Br$ | 0.5 | 1,900,000 | >2 |
| 3 | $Cl(CH_2)_4Cl$ | 15.6 | 2,800,000 | >3 |

*Not an example of this invention.
(1) Same as (1) in Table I.
(2) Same as (2) in Table I.
(3) Same as (3) in Table I.

As noted by the data recorded in Table II, a cross-linked polysaccharide ether exhibiting substantially increased viscosity is effectively prepared without the formation of substantial amounts of water-insoluble material using a variety of different cross-linking agents at different concentrations.

EXAMPLE 3

In a manner similar to Example 1, a cross-linked hydroxypropyl methylcellulose is prepared using wood flock (intrinsic viscosity in sodium ferric tartrate of 980 ml/g) as the cellulose. The resulting cross-linked hydroxypropyl methylcellulose exhibits a viscosity, as a 2 percent aqueous solution, of 23,500 cps and 2.3 percent solids. A hydroxypropyl methylcellulose prepared using the same method except that no 1,2-dichloroethane is added to the reaction mixture is prepared. The resulting hydroxypropyl methylcellulose exhibited a viscosity, as a 2 percent aqueous solution, of only 15,000 cps and about 1.5 percent solids. As evidenced by the 56 percent increase in the viscosity, the method of this invention is shown to be effective in preparing a cross-linked, polysaccharide ether from different sources of cellulose.

EXAMPLE 4

To a suitably sized pressure vessel similar to the vessel employed in Example 1 is added, with agitation, 5730 parts of toluene, 60 parts of a sorbitan monostearate surfactant and 393 parts of a 50 weight percent aqueous solution of sodium hydroxide. The vessel is then purged with nitrogen for 10 minutes, followed by the addition of 477 parts of cotton linter, 2.1 parts of 1,2-dichloroethane and 162 parts of methyl chloride. Following this addition, the temperature of the mixture is increased to 55° C. While mildly agitating the reaction mixture, 620 parts of ethylene oxide are added to the vessel at a rate of about 6.6 parts per minute. Coincident with the start of this addition, the temperature of the mixture is increased over a one-half-hour period to 90° C. and the mixture maintained at this temperature during the addition of the remaining ethylene oxide. After complete addition of the ethylene oxide, 310 parts of an 88 weight percent solution of formic acid is added to the reaction mixture. The reaction mixture is maintained at 90° C. for 2½ hours. At the end of this period, the vessel is cooled to ambient temperatures and the vessel vented. The product is filtered from the remainder of the slurry, washed with acetone and then air dried. The product is then treated with glyoxal which temporarily cross-links the hydroxyethyl methylcellulose to facilitate salt removal. The glyoxal treated product is washed with cold water, rinsed with acetone and air dried. The hydroxyethyl methylcellulose is subsequently treated with an acid to destroy the glyoxal cross-linkages. The resulting cross-linked hydroxyethyl methylcellulose prepared by the method of the present invention exhibits a viscosity, as a 1 percent aqueous solution of 5000 cps and a percent solids of only 0.5 percent. A hydroxyethyl methylcellulose prepared in an identical manner except having no 1,2-dichloroethane added to the reaction mixture exhibits a viscosity, as a 1 percent aqueous solution, of 3400 cps and 0.45 percent solids.

As evidenced by the 47 percent increase in viscosity without a substantial increase in the percent of water-insoluble product, a cross-linked hydroxyethyl methylcellulose having excellent properties is readily prepared by the method of this invention.

EXAMPLE 5

To a suitably sized pressure vessel similar to the vessel employed in Example 1 is added with agitation 7000 parts of a propylene glycol isobutyl ether sold as Dowanol® PiB-T by The Dow Chemical Company, 146 parts of a 40 percent aqueous solution of sodium chloroacetate and 620 parts of a 50 weight percent solution of sodium hydroxide. The vessel is then purged with nitrogen for 5 minutes, followed by the addition of 454 parts of cotton linter. The vessel is purged with nitrogen for an additional 20 minutes and then 54 parts of 1,2-dichloroethane and 550 parts of methyl chloride are added to the vessel. While mildly agitating the reaction mixture, the vessel is slowly heated over a 3-hour period until the temperature of the reaction mixture reaches 75° C. This temperature is maintained for an additional 1½ hours. At the end of this period, the temperature of the reaction mixture is increased to 95° C. and maintained at this temperature for 4 hours. At the end of this period, the reaction mixture is cooled to ambient temperatures and the pressure vessel vented. The resulting product is neutralized with acetic acid, washed with acetone and air dried. The resulting cross-linked carboxymethyl methylcellulose exhibits a viscosity, as a 2 percent aqueous solution, of 8,400,000 cps, and 25 percent solids. A carboxymethyl methylcellulose prepared in a similar manner except no 1,2-dichloroethane is added to the reaction mixture exhibits a viscosity, as a 2 percent aqueous solution, of only 4,000,000 cps, and 20 percent solids.

As evidenced by this Example, the method of this invention is suitably employed in the preparation of ionic, as well as nonionic, polysaccharide ethers.

What is claimed is:

1. A method for preparing a cross-linked polysaccharide ether, soluble in an aqueous liquid, said method comprising the step of contacting a polysaccharide prior to, simultaneous with or subsequent to the etherification thereof, with an amount of a polyhalo hydrocarbon selected from the group consisting of a polyhalo methane and an alkylene, alkylidene or halo substituted alkylene or alkylidene polyhalide bearing two halo substituent groups, wherein each halo group is bonded to a primary or secondary carbon atom of an alkylene, alkylidene or halo substituted alkylene or alkylidene group of two or more carbon atoms, at conditions sufficient to cross-link the polysaccharide without substantial amounts of the resulting cross-linked polysaccharide ether being insoluble in water.

2. The method of claim 1 wherein the polysaccharide is contacted with the polyhalo hydrocarbon in the presence of a base.

3. The method of claim 2 wherein the polyhalo hydrocarbon is a polyhalo methane or a polyhalide represented by the formula:

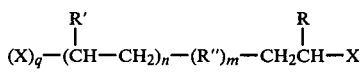

wherein X is a halogen, n and m are individually 0 or an integer, q is 0 or 1 provided that if R is not a halogen then q is 1, R and R' are individually hydrogen, halogen or an alkyl and R" is an aliphatic or aromatic.

4. The method of claim 3 wherein q is 1, each X is chlorine or one X is chlorine and one X is bromine, n is 0 or an integer from 1 to 5, m is 0 and R and R' are individually hydrogen or methyl.

5. The method of claim 2 wherein the polyhalo hydrocarbon is chloroform, carbon tetrachloride or a polyhalide represented by the structural formula:

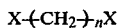

wherein X is a halogen and n is an integer from 1 to about 10.

6. The method of claim 5 wherein the polyhalo hydrocarbon is methylene chloride; 1,2-dichloroethane; 1,3-dichloropropane or 1,4-dichlorobutane.

7. The method of claim 2 wherein the polysaccharide is cellulose and the cross-linked polysaccharide ether is a cross-linked methylcellulose, hydroxypropyl methylcellulose, hydroxy ethylcellulose, ethyl methylcellulose, hydroxyethyl hydroxypropyl methylcellulose or carboxymethyl methylcellulose.

8. A method for the in situ preparation of a cross-linked polysaccharide ether, said method comprising the step of contacting a polysaccharide etherification reaction mixture with an amount of a polyhalo hydrocarbon selected from the group consisting of a polyhalo methane and an alkylene, alkylidene or halo substituted alkylene or alkylidene polyhalide bearing two or more halo substituent groups, wherein each halo group is bonded to a primary or secondary carbon atom of an alkylene, alkylidene, halo substituted alkylene or alkylidene group of two or more carbon atoms, at conditions sufficient to form a cross-linked polysaccharide ether which is not substantially insoluble in water.

9. The method of claim 8 wherein the polyhalo hydrocarbon is a polyhalo methane or a polyhalide represented by the structural formula

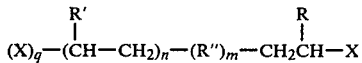

wherein X is a halogen, n and m are individually 0 or an integer, q is 0 or 1 provided that if R is not a halogen then q is 1, R and R' are individually hydrogen, halogen or an alkyl and R" is an aliphatic or aromatic.

10. The method of claim 9 wherein q is 1, each X is chlorine or one X is chlorine and one X is bromine, n is 0 or an integer from 1 to 5, m is 0 and R and R' are individually hydrogen or methyl.

11. The method of claim 8 wherein the polyhalo hydrocarbon is chloroform, carbon tetrachloride or a polyhalide represented by the structural formula:

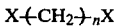

wherein X is a halogen and n is an integer from 1 to about 10.

12. The method of claim 8 wherein the polyhalo hydrocarbon is 1,1-dichloroethane; 1,2-dichloroethane; 1,3-dichloropropane; 1,4-dichlorobutane; 1,3-dichlorobutane; methylene chloride; chloroform or carbon tetrachloride.

13. The method of claim 8 wherein the polysaccharide etherification reaction mixture comprises an alkali cellulose or a cellulose and an alkali metal hydroxide, an etherifying agent and a reaction diluent.

14. The method of claim 13 wherein the etherifying agent is an alkyl monochloride, a vicinyl epoxide or a monocarboxylic acid or salt thereof; the polyhalo hydrocarbon is represented by the structural formula:

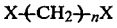

wherein X is a halogen and n is an integer from 1 to about 10; the reaction diluent is an aromatic hydrocarbon or lower ketone and the in situ preparation of the cross-linked polysaccharide ether is conducted at a temperature from about 50° to about 120° C.

* * * * *